July 23, 1940.  C. W. MOTT  2,209,032
FLUID DEVICE
Filed Aug. 12, 1938
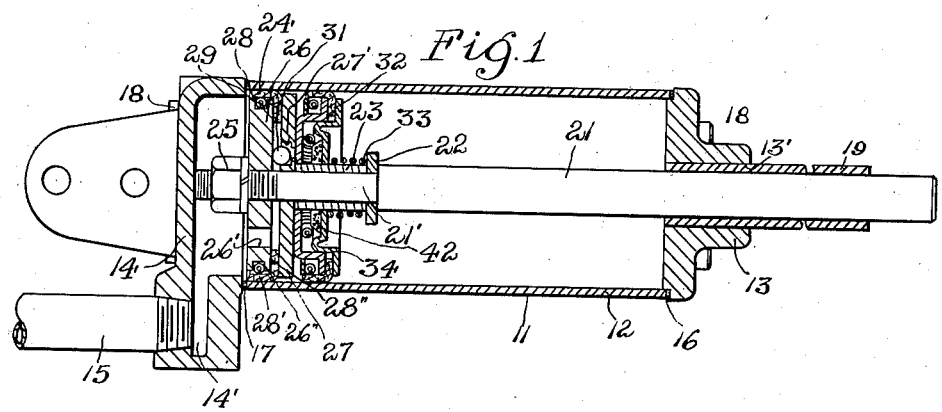
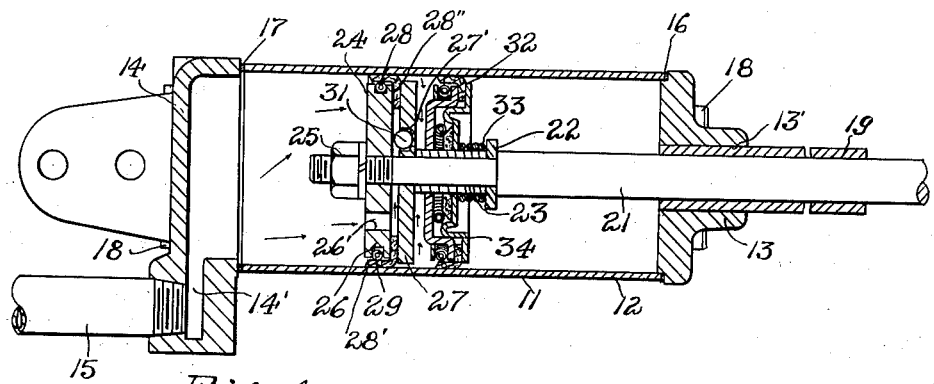
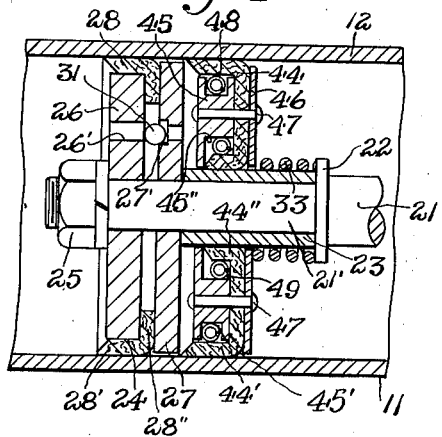
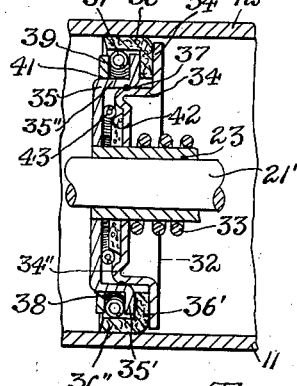
Inventor
Carl W. Mott
By V. F. Laraque
Atty Patented July 23, 1940

2,209,032

UNITED STATES PATENT OFFICE 2,209,032

FLUID DEVICE

Carl W. Mott, Rock Falls, Ill., assignor to International Harvester Company, a corporation of New Jersey Application August 12, 1938, Serial No. 224,460

6 Claims. (Cl. 309—22)

This invention relates to fluid devices and more particularly to means for preventing the leakage of fluid from the same.

In devices heretofore, particularly in those devices of the single-acting type, no satisfactory means has been provided for preventing leakage from the device and at the same time provide a device which is efficient and workable. In the end of a cylinder, through which the piston rod or a workable piston passes, the leakage fluid which may have passed by the piston during the operation of the device is collected, and, in the usual device, if allowed to stand in that end of the cylinder, it will be forced through the piston rod opening, resulting eventually in great loss of fluid. The placing of a fluid seal about the piston rod in that end of the cylinder, while to a certain extent prevents leakage of fluid from the device, does not eliminate the collecting of the fluid which may have escaped by the piston to that end of the device. When sufficient fluid is collected, there is a general cut-down in the working stroke of the piston and eventually stoppage of the same. Also, by the use of such a seal, the operation of the piston might also be impaired as a result of a vacuum tending to prevent the piston from returning for the working stroke. Also, with the types heretofore, delicate machining of the parts has been necessary in an effort to perfect a device which would give less leakage.

The object of this invention is to provide an improved fluid device of the single-acting type, in which a fluid seal in the end of the cylinder for the piston rod side of the device is unnecessary.

It is another object of this invention to provide means for collecting such fluid, which may have escaped by the piston, and returning it to the side of the piston from which it so escaped, and this means to be of such a type that leakage will not be collected at the piston rod side of the cylinder prior to its removal or return to its proper location.

It is another object of this invention to provide a fluid device in which machining of the parts is unnecessary, and consequently in which the cost of manufacture is greatly reduced.

This invention takes the form of an expansible chamber-like piston associated with the cylinder, which collects the fluid immediately upon passing by the main portion of the piston and, upon the release of fluid pressure on the working side of the piston, returns this leakage fluid so collected to that side of the piston through a valve control opening in the portion thereof. This expansible means comprises in general a piston-like structure having sealing means in wiping engagement with the inside of the cylinder and carried by the piston rod means immediately in rear of the main portion of the piston. This piston-like structure is slidable on the piston rod means, and spring biased toward the main portion of the piston. By such a means, the fluid is immediately collected as it passes the piston and hence is never permitted to collect in the rear of the cylinder where it could be forced outwardly of the device through the piston rod opening thereof.

For a better understanding of the invention, reference may be had to the following detailed description taken in connection with the accompanying drawing, in which:

Figure 1 is a cross sectional view in elevation of the fluid device embodying the present invention, and wherein the piston is in position to be worked upon by the working fluid;

Figure 2 is a view similar to Figure 1, where the piston has been partly moved by the working fluid with the chamber-like structure expanded by a fluid that escaped by the piston;

Figure 3 is an enlarged view of the form of the piston-like structure shown in Figures 1 and 2; and, Figure 4 is a modified form of a piston-like structure that may be utilized in lieu of the structure shown in Figure 3.

Referring to the drawing, there is shown a cylinder-enclosing member 11 comprising a cylinder 12 made of standard pipe material, a cylinder head 13 having an opening 13', through which the piston rod may slide, a cylinder head 14 on the working side of the device having a chamber 14' for receiving fluid by means of a pipe 15 threadedly connected to the cylinder head 14 in fluid communication with the chamber 14'. Gaskets 16 and 17 may be provided at each end of the cylinder 12 to cooperate with the respective cylinder heads 13 and 14 when the cylinder means is assembled and retained by tie rod means 18 interconnecting the two cylinder heads.

In the opening 13' there is provided a guide sleeve 19, which extends outwardly at some length from the end of the cylinder means for the reception of piston rod means 21 to keep that portion of the piston rod means, which enters the cylinder means, from being exposed when the fluid device is actuated and in that way to act as a seal from dirt which would tend to accumulate on the piston rod and be dragged into the cylinder means. This piston rod means comprises a projected portion 21' of smaller diameter than the main portion of the piston rod means, a ring 22, and a sleeve 23 carried by the projected portion 21'. Mounted on this projected portion 21' is a main piston structure 24 in abutting relation with the end of the sleeve 23 and retained thereagainst by means of a nut 25 on the projecting portion 21'.

This piston structure 24 is made of two plate elements 26 and 27, which may be struck out of standard stock material, each of which have openings 26' and 27', respectively. This piston member is so made in two parts for the purpose of providing means for retaining a piston ring 28 of flexible material and having a longitudinally extending portion 28' and a radially extending portion 28". The radially extending portion is disposed between the two plates and, when the same are drawn together against the end of the sleeve 23 by the nut means 25, the ring 28 will be rigidly held in the piston structure. For maintaining the longitudinal portion 28' of the piston ring 28 against the inside of the cylinder, there is provided a circumferentially-expanding spring ring 29 located in a groove 26" in the element 26. The openings 26' and 27' are in communication with each other through the space interposed by the thickness of the radial portion 28" of the piston ring, and all openings form in general a single opening through the piston-like structure. The opening 27' in the element 27 is shaped to receive a ball valve element 31, thus providing means for control of fluid through the piston structure. When fluid is being provided at the working or fluid side of the cylinder means 11, to work the piston, this fluid will act upon the ball valve 31 and hence close the general opening through the piston structure.

On the sleeve 23 and associated with the piston structure 24, there is a piston-like structure 32 adapted for sliding movement relative to the piston 24 and longitudinally along the piston rod means 21'. This piston-like structure is backed up by a biasing spring 33 carried by the sleeve 23 and retained by the ring 22, which tends to maintain this structure against the rear face or plate 27 of the piston structure 24.

Referring now to Figure 3, there is shown the piston-like structure of the form shown in Figures 1 and 2 in enlarged proportions, which comprise two interfitting members 34 and 35 having flange portions 34' and 35', respectively, between which is a radial portion 36' of a wiping ring 36 and there maintained by the welding of the interfitting members, as indicated at 37. In order to retain a longitudinally extending portion 36" of the ring 36 in wiping enegagement inside the cylinder 12, there is provided a circumferentially-expanding ring 37 of flexible material, bearing thereagainst and retained in a groove 38 formed on the outer portion of the interfitting member 35 by the provision of a ring 39 welded, as at 41, to the longitudinally extending portion 35" of the member 35. This ring 39, taken with the flange portion 35' and the longitudinally extending portion 35", forms a groove for the insertion of the expanding ring 37.

For the sealing of the piston-like structure with the piston rod means 21, there is provided a sealing means comprising a piece 42 of flexible sealing material having its end in wiping contact with the sleeve 23 of the piston rod means. In order to maintain this material 42 in contact, there is provided a circumferentially-contracting spring ring 43 surrounding the flexible material 42 and retained in its position thereagainst by a projecting portion 34" of the interfitting member 34. Hence, there has been provided in the piston-like structure sealing means for sealing of the fluid along the piston rod means and a sealing means for sealing with relation to the inside of the cylinder 12.

In the operation of the device, fluid is received therein through the pipe 15 under pressure, and it engages the piston structure 24 to perform work in moving the same toward the piston rod side of the device. As this fluid is applied under pressure, there is a tendency, at the best, for some fluid to leak by the piston ring 28, the ball valve 31 having been closed by fluid entering the opening 26' and bearing against the same. As the piston moves toward the position shown in Figure 2, it is possible that sufficient oil may have leaked by the ring 28 in order to move the piston-like structure 32 rearwardly to compress the spring biasing means 33. As long as the fluid pressure continues to retain the ball valve 31 against its seat, the spring 33 will remain compressed, but, as soon as the fluid pressure has been released from the working side of the device to permit the return of the piston after the working stroke has been completed, the fluid so collected between the piston 24 and the piston-like structure 32 will be forced by the ball valve 31 and through the piston 24 and will be returned to the working side of the device. This space between the piston structure 24, when taken with the piston-like structure 32 and being so associated with the piston 24, may be regarded as an expansible chamber-like structure associated with the movable piston member of the device. Or, the two structures 24 and 32, when taken in their entirety, may be termed an expansible piston.

Referring now to Figure 4, there is shown modified form of the piston-like structure which differs from the form shown in Figure 3, in that there is provided a single piece 44 of flexible material having longitudinally-extending portions 44' and 44" bearing respectively against the inside of the cylinder 12 and against the sleeve 22 of the piston rod means 21. By the use of a single channel section piece of material, this structure is greatly simplified and its assembly is obtained much more quickly. The piece of material 44 is retained by the two members 45 and 46 and secured together by rivets 47. The member 45 has a groove 45' for maintaining the circumferentially-expanding ring 48 used to retain the longitudinally-extending wiping portion 44' against the inside of the cylinder 12. It also has a shoulder portion 45" for maintaining a circumferentially-contracting ring 49 in its position to retain the longitudinally-extending portion 44" against the sleeve 22 of the rod means 21.

It should now be seen that there has been provided means for collecting leakage fluid tending to leak by the piston and for forcibly returning the same to the side of the piston from which it has escaped. By the use of such means and in the form shown, none of the fluid is permitted to collect at the piston rod end of the cylinder structure to be forced through the opening 13' on the working stroke of the piston, but it is immediately collected near to the location where the same has escaped by the piston and returned before any large quantities may have been collected. In other words, it may be said that the fluid is actually collected by the piston itself before it could be deposited in an end of the cylinder structure. Thus, by so collecting the fluid, prior to its getting into the cylinder, the necessity for sealing means in the opening 13' of the cylinder head 13 for sealing against leakage along the piston rod is unnecessary in the present form of the invention. Thus is eliminated any possibility of the piston rod refusing to return because of a vacuum created in the piston rod side of the cylinder, where a seal about the piston rod is to be used.

It should also be noted that, by the application of the present invention, it is no longer necessary to have a well machined piston or cylinder, since, by the use of applicant's invention, leakage may be allowed to take place in great quantities without impairing the efficiency of the device. Hence, by the advent of the present invention, these parts may be struck from ordinary standard material, thus making for the decrease in cost of manufacture of these devices.

While various changes in the detailed construction of the forms of the present invention may be made, it will be understood that these changes may be made without departing from the spirit and scope of the present invention as defined in the appended claims.

What is claimed is:

1. In a fluid device, two members movable relative to each other, one of the members enclosing the other, a valve-controlled passage means in one of the members adapted to be maintained closed by working fluid, and biasing means carried by one of the members in communication with said passage means and movable relative thereto by leakage fluid escaping between the two members and returnable to return the fluid to the location from which it so escaped upon release of the working fluid in said valve-controlled passage means.

2. In a fluid device, a cylinder and a piston relatively movable with respect to each other, a valve-controlled passage means in the piston adapted to be maintained closed by the working fluid, and an expansible chamber-like means in communication with the passage means to collect leakage fluid which may escape between the piston and cylinder and to return the same to the side of the piston from which it escaped upon release of the working fluid on said valve-controlled passage means.

3. In a fluid device, a cylinder, a piston in the cylinder having a valve-controlled opening therethrough adapted to be closed during the working stroke of the piston, a piston-like structure associated with the piston for relative movement with respect thereto and having a fluid-tight but sliding engagement with the inside of the cylinder, and biasing means permitting of movement of the structure relative to the piston for the deposit of leakage fluid, which may have escaped by the piston, and for returning the structure to force the fluid so deposited through the valve-controlled opening upon release of fluid on the working side of the piston.

4. In a fluid device, an enclosing cylinder means, a piston movable within the cylinder means, a piston rod means connected to the piston, valve-controlled means in the piston permitting only flow of fluid from the piston rod side of the piston but being maintained closed by the piston working fluid, a piston-like structure movably mounted on the piston rod means, and means tending to biasingly maintain the structure against the rear of the piston but permitting of movement away from the piston by leakage fluid, which may have escaped by the piston, and to return this fluid to the working side of the piston upon release of the working fluid.

5. In a fluid device, a cylinder, a piston movable in the cylinder and having a valve-controlled opening therethrough adapted to be maintained closed by the piston working fluid, and a spring-biased piston-like structure movable with the piston and relative thereto to force fluid, which has escaped by the piston, through the opening in the piston to return the same to the fluid side thereof upon release of the working fluid.

6. In a fluid device, an enclosing cylinder means, a piston movable within the cylinder and having piston rod means connected thereto and slidable through one end of the cylinder, valve-controlled means in the piston permitting only flow of fluid from the piston rod side of the piston but being maintained closed by the piston working fluid, a piston-like structure mounted for movement on the piston rod means and having fluid-tight but sliding engagement with the inside of the cylinder, and biasing means permitting of movement of the structure on the piston rod relative to the piston for the deposit of leakage fluid, which may have escaped by the piston, and for returning the structure to forcibly return the fluid so deposited through the valve-controlled means to the working fluid side of the piston upon release of the working fluid.

CARL W. MOTT.